(12) United States Patent
Kranz et al.

(10) Patent No.: US 7,516,147 B2
(45) Date of Patent: Apr. 7, 2009

(54) URL SYSTEM AND METHOD FOR LICENSING CONTENT

(75) Inventors: David A. Kranz, Arlington, MA (US); Robert H. Halstead, Jr., Belmont, MA (US); Tom Lyons, Cambridge, MA (US)

(73) Assignee: Sumisho Computer Systems Corporation, Tokyo (JP)

( * ) Notice: Subject to any disclaimer, the term of this patent is extended or adjusted under 35 U.S.C. 154(b) by 290 days.

(21) Appl. No.: 10/692,314

(22) Filed: Oct. 23, 2003

(65) Prior Publication Data

US 2005/0091216 A1    Apr. 28, 2005

(51) Int. Cl.
*G06F 17/00* (2006.01)
*H04K 1/00* (2006.01)

(52) U.S. Cl. ............... 707/102; 707/6; 707/9; 707/101; 707/103 X; 707/104.1; 705/57

(58) Field of Classification Search .......... 707/3, 707/10, 2, 6, 102, 101, 103 X, 104.1; 705/59, 705/52, 57, 51; 709/229; 713/189, 153, 713/165, 193; 726/32
See application file for complete search history.

(56) References Cited

U.S. PATENT DOCUMENTS

| | | | | |
|---|---|---|---|---|
| 5,287,408 | A | 2/1994 | Samson | 705/59 |
| 5,724,425 | A | 3/1998 | Chang et al. | 705/52 |
| 5,745,765 | A | 4/1998 | Paseman | 717/107 |
| 5,790,664 | A | 8/1998 | Coley et al. | 709/203 |
| 5,950,001 | A | 9/1999 | Hamilton et al. | 717/107 |
| 5,963,953 | A | 10/1999 | Cram et al. | 707/102 |
| 6,059,838 | A | 5/2000 | Fraley et al. | 717/108 |
| 6,189,146 | B1 | 2/2001 | Misra et al. | 717/177 |
| 6,226,747 | B1 | 5/2001 | Larsson et al. | 726/31 |
| 6,708,250 | B2 * | 3/2004 | Gillingham | 711/108 |
| 6,915,425 | B2 * | 7/2005 | Xu et al. | 713/165 |
| 6,983,371 | B1 * | 1/2006 | Hurtado et al. | 713/189 |

(Continued)

FOREIGN PATENT DOCUMENTS

EP    0 686 906 A2    12/1995

(Continued)

OTHER PUBLICATIONS

Marc Fetscherin et al., "Comparing the usage of digital rights management systems in the music, film, and print industry", ACM, Sep. 2003, pp. 316-325.*

(Continued)

*Primary Examiner*—Thuy N Pardo
(74) *Attorney, Agent, or Firm*—Finnegan, Henderson, Farabow, Garrett & Dunner, LLP

(57) ABSTRACT

A licensing system and method for deploying digital content is provided. A client system can download the digital content from the server and, if a valid license for the content is also found on the server, software may be permitted to run digital content. The license is stored in a location that is separate from the content. The license can be located using the URL address of the content. The system can locate the license on the server and determine whether the license covers the content. Content that is covered by the license can be processed and rendered. The content can be any form of digital media, such as a computer application.

42 Claims, 8 Drawing Sheets

U.S. PATENT DOCUMENTS

| | | | |
|---|---|---|---|
| 7,069,271 B1 * | 6/2006 | Fadel et al. | 707/102 |
| 7,110,984 B1 * | 9/2006 | Spagna et al. | 705/57 |
| 7,216,368 B2 * | 5/2007 | Ishiguro | 726/32 |
| 7,277,870 B2 * | 10/2007 | Mourad et al. | 705/51 |
| 7,324,972 B1 * | 1/2008 | Oliver et al. | 705/40 |
| 7,346,580 B2 * | 3/2008 | Lisanke et al. | 705/50 |
| 2001/0011254 A1 | 8/2001 | Clark | 705/59 |
| 2002/0120839 A1 * | 8/2002 | Hein, III | 713/153 |
| 2004/0181490 A1 * | 9/2004 | Gordon et al. | 705/59 |
| 2005/0021783 A1 * | 1/2005 | Ishii | 709/229 |
| 2005/0086501 A1 * | 4/2005 | Woo et al. | 713/189 |
| 2005/0246282 A1 * | 11/2005 | Naslund et al. | 705/52 |
| 2005/0278259 A1 * | 12/2005 | Gunaseelan et al. | 705/59 |
| 2006/0053077 A1 * | 3/2006 | Mourad et al. | 705/51 |
| 2006/0085343 A1 * | 4/2006 | Lisanke et al. | 705/50 |
| 2006/0089912 A1 * | 4/2006 | Spagna et al. | 705/51 |
| 2006/0095792 A1 * | 5/2006 | Hurtado et al. | 713/189 |
| 2007/0124602 A1 * | 5/2007 | Wald et al. | 713/193 |

FOREIGN PATENT DOCUMENTS

| | | |
|---|---|---|
| WO | WO 98/25373 | 6/1998 |
| WO | WO 98/45768 | 10/1998 |

OTHER PUBLICATIONS

Linux Journal Staff, "Linux distributions compared", ACM, 1996, pp. 1.*

"Calico Commerce: Calico Launches Advanced Interactive Selling Configuration Software; Network Advisor Enables Component-based Modeling for Rapid Configuration of Highly Complex Products and Services," *M2Presswire* (Aug. 9, 2001).

Hostetter, M., et al., "Curl: A Gentle Slope Language for the Web," *MIT Laboratory for Computer Science World Wide Web Journal*, vol. II(2), Spring 1997.

* cited by examiner

URL SYSTEM AND METHOD FOR LICENSING CONTENT

BACKGROUND

As the software industry has evolved over the years, there have been a myriad of ideas and methods for licensing and restricting access to digital content. Increasingly, the trend among content developers is to incorporate some form of digital rights management. Generally, digital rights management licensing schemes require some type of security measure in order to restrict access to protected digital content. Some of the commonly incorporated security measures include passwords, biometric thumbprints, encryption, digital signature techniques and serial numbers locked to hardware, such as individual PCs or dongles. Such security schemes, however, come at a high price. Not only do they typically place heavy burdens and ultimately inconvenience the user, they also can result in significant overhead costs because of the time and maintenance burdens on the developer and content provider.

In today's dynamic global environment, the critical nature of accuracy and speed can mean the difference between success and failure for a new software product or even a company. The process of deploying security schemes to protect access to digital content is long, involved and expensive. The difficulties of this process are compounded by the unique challenges that companies face to satisfy their customers expeditiously in order to survive in this dynamic global environment.

Content users want unfettered access to digital content without being required to undergo a burdensome authentication process. A licensed product that requires a user to navigate through a lengthy authentication process or security scheme will likely be unsuccessful. Moreover, users do not want to have to pay for the added cost of a security measure attached to digital content. Meanwhile, content providers want a security scheme that is easily implemented and enables them to effectively deploy content and garner a financial return without encumbering the content users. Software developers also want a mechanism that enables them to have a financial return. Thus, one of the most complicated aspects of developing a security model for deploying content is finding a scheme in which the cost benefit analysis accommodates all participants, i.e. the content user, content provider and software developer. At this time, the currently available schemes do not provide a user-friendly, developer-friendly and financially effective solution to restrict access to digital content.

SUMMARY

To address many of the above-mentioned problems, licensing techniques have been designed that allow users to have relatively unencumbered access to digital content, while software developers and/or content providers are provided with a mechanism to secure a financial return. This is achieved by embedding, within the content, licensing information. Software that accesses the content may be distributed to clients, perhaps at no charge, and that software checks the licensing information before permitting the content to be rendered. In this approach, the end-user does not need a license to play the content. Rather, the license is for the server to deploy the content, and the license is only checked by the software running on the client. As a result, the end-user of the client system can be unaware of this licensing process. Aspects of these licensing techniques are described in U.S. patent application Ser. No. 09/267,269 now U.S. Pat. No. 6,766,305 and Ser. No. 09/936,768, now abandoned, the entire teachings of which are incorporated herein by reference.

In accordance with the present invention, the above concepts are extended to a licensing method and system whereby licensing information does not need to be embedded with the content. Rather, the licensing information is separate from the content. A Uniform Resource Locator (URL) address of digital content on a server computer system may be used to obtain licensing information that is in a separate location than the digital content. When the license is located, it is examined to confirm that the content is covered by the license.

In one embodiment of the invention, a client computer system downloads licensed content from a server computer system. When the client receives the content from the server, client software can automatically look on the server for a license that covers the content. To determine the location of the license on the server, the software uses the content's URL as a point of reference. If the license can be located, it can be processed or examined to verify that it is authentic. This can be performed, for example, by verifying a digital signature in the license.

Once the license is verified, it can be processed to determine which URL address is covered by the license. To determine this, the license is examined for information about a URL pattern referenced in the license. The URL pattern can identify one or more licensed deployment locations. The URL pattern can be a URL address, hostname or URL prefix identifying the URL addresses which are covered by the license. Content coming from those URL addresses may be considered licensed. When the URL pattern has been determined from the license, the pattern can be compared with the URL address of the content on the server. If, for example, a domain name identified in the URL pattern matches the domain name in the content's URL, then the license may be the correct license for the content.

A software system may be designed to facilitate a licensing process. The software can be used for downloading the content from a server and verifying a license for the content. The software usually includes routines or objects designed to recognize and validate the license on the server. For example, the software may include a licensing manager that handles the licensing process. The software may include a communications handler, which is responsive to requests to download licensed content from a server. The software may include one or more routines, which are used to locate the license, verify its authenticity and determine which URL address is covered by the license. The software may be installed on a client system or on a distributed system. The software, for example, can be the client's runtime environment, media player, applet, plug-in or web browser. The software may communicate with the server using, for instance, HTTP and TCP/IP protocols, to download the content and locate the license. If the license is authenticated and it is the correct license for the content, the software is allowed to run or play the content on the client system.

Features or policies associated with the license may be determined from the license. For example, the license may include restrictions under which the content is made available. The license may indicate that certain features of the content may be enabled or disabled. The invention may recognize and validate a license from the server and limit processing of, or access to, the content pursuant to the validity or terms of the license.

A single license may cover several different deployment locations. If, for example, the content on the server is an application, one license can cover multiple application URLs, applications from multiple directories and also multiple hostnames. Software can be used to look for the license through the root directory of the URL address of the content. A license stored through the root directory can override or preempt licenses located elsewhere on the server. If a license is not found through the root directory, then the software may look for a license through the subdirectory of the URL address of the digital content.

A license may also be cached on the client system. This can be particularly useful when the license includes a URL pattern that refers to multiple URL addresses of content, such as several applications, that are covered by the license. A cached license can enable the client system to continually access all content covered by the license without having to expend system resources, such as bandwidth, because the client does not need to go back to the server each time it needs to determine whether the content it is downloading is licensed.

The license may include a license key. The license can be checked to determine whether the license has been altered. The license may include a digital certificate. The license may be encrypted. The license can operate under a licensing model, such as a non-commercial use or pay-per-use licensing model.

A licensing mechanism may be supported wherein the provider of runtime software, which is utilized in the interpretation of web content, may license the use of web content that may be played with that software without controlling access to either the software or the web content. For example, the provider can distribute the runtime software freely to the user and the runtime software can be installed on client systems to allow the systems to interpret web content associated with the software. A content provider can create web content that is associated with the software and deploy the content from its server by obtaining a license from the software provider. The software provider can issue a license key to the content provider, which can be placed on the server to license the content. The license located on the server may allow the client systems that have the software to run the content in a user-friendly manner.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
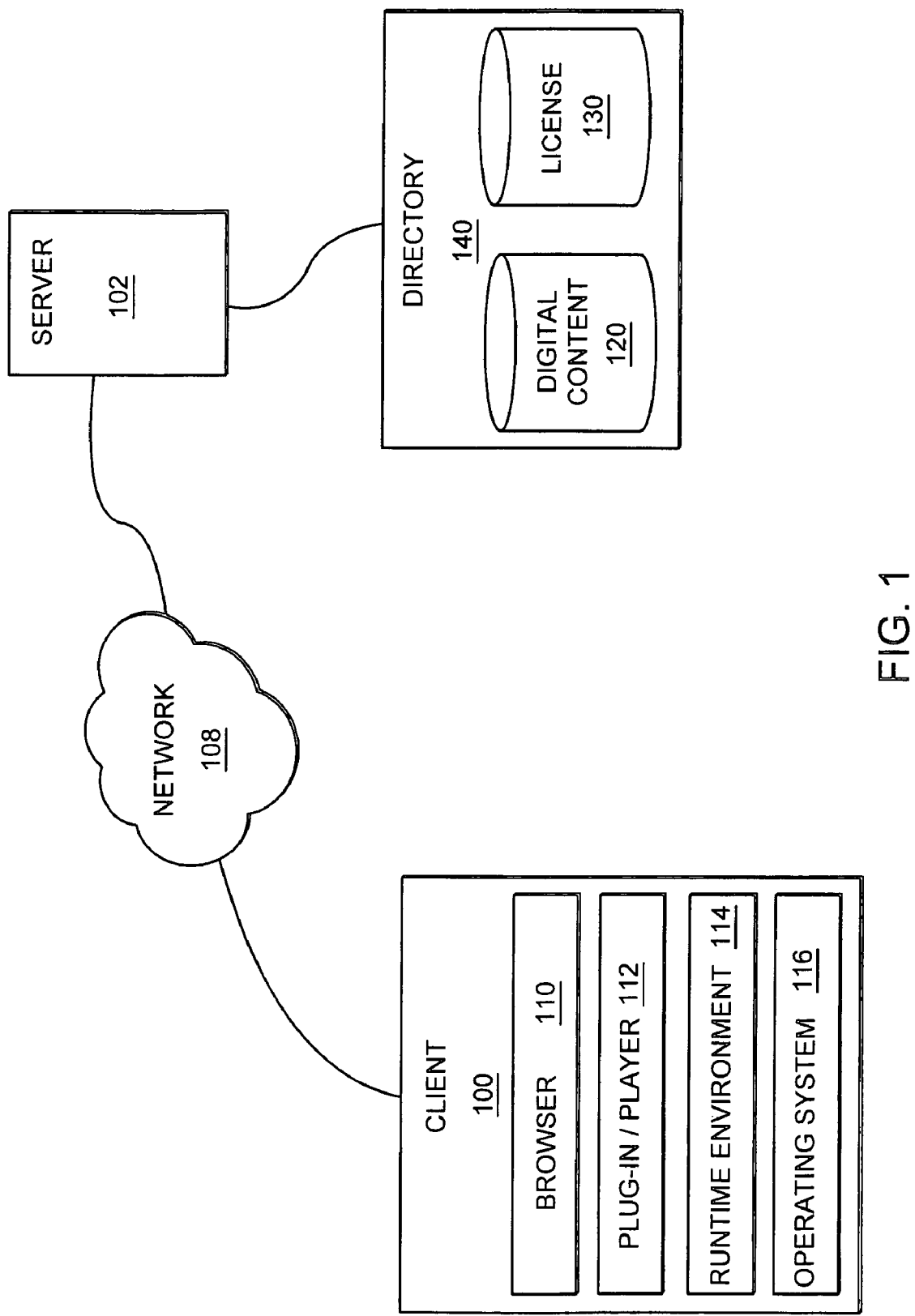
FIG. 1 is a diagram illustrating computer systems architecture for a licensing system according to an embodiment of the invention.

A description of preferred embodiments of the invention follows.

Types of Licenses

Software licenses can range from usage-based models to network licensing. For example, licenses can include public licenses, such as general non-exclusive user licenses (GNU licenses), evaluation licenses (demo versions that expire after a period of time), feature licenses (where only certain features of the product are enabled), floating network licenses (where a server has a limited number of licenses to distribute at a time), personal licenses and pay-per-use licenses. Further types of licenses are described in U.S. patent application Ser. Nos. 09/267,269 and 09/936,768.

While these different types of licenses can generally accommodate different customer needs and create additional revenue opportunities for software developers, additional problems remain. Apart from the features of the license, one of the most complicated aspects of licensing is actually implementing the license in a licensing model, in which the cost benefit analysis accommodates all license participants, i.e. the user, developer and content provider.

Client Server Architecture

The present invention provides a licensing system based on the client 100, server 102 framework. A client computer system 100 is connected to a network 108, such as an intranet, extranet or Internet. The client 100 includes a web interface (usually a browser) 110, runtime environment 114 and operating system 116. Although the runtime environment 114 can be any runtime engine, such as a default runtime engine associated with the browser 110, Sun Microsystems's Java Virtual Machine™ or Microsoft Corporation's Common Language Runtime™ engine, preferably it is the Surge™ Runtime Environment available from Curl Corporation of Cambridge, Mass. The runtime environment 114 handles the execution of code. It typically is viewed as the Web middle layer between the web applications 110, 112 and the operating system 116.

The browser 110 often calls the runtime environment 114 and a plug-in or media player 112 to perform certain actions. When the browser 110 attempts to fetch or load digital content from the server 102, the browser 110 processes the content. If the content is associated with specific software, such as a media player or plug-in 112, then the browser 110 can load the plug-in 112 associated with the content type. Control is then passed to the plug-in 112 to process and play the content, and the plug-in can also interface with the runtime environment 114 to facilitate this process. If an appropriate plug-in is not available to the browser 110 on the client computer 100, an appropriate plug-in may be obtained from another source, typically a server 102 on the Internet 108. When a browser fetches content, for example, Curl content, the browser 110 locates and loads a corresponding Curl plug-in.

Client Runtime Environment

Figure 2:
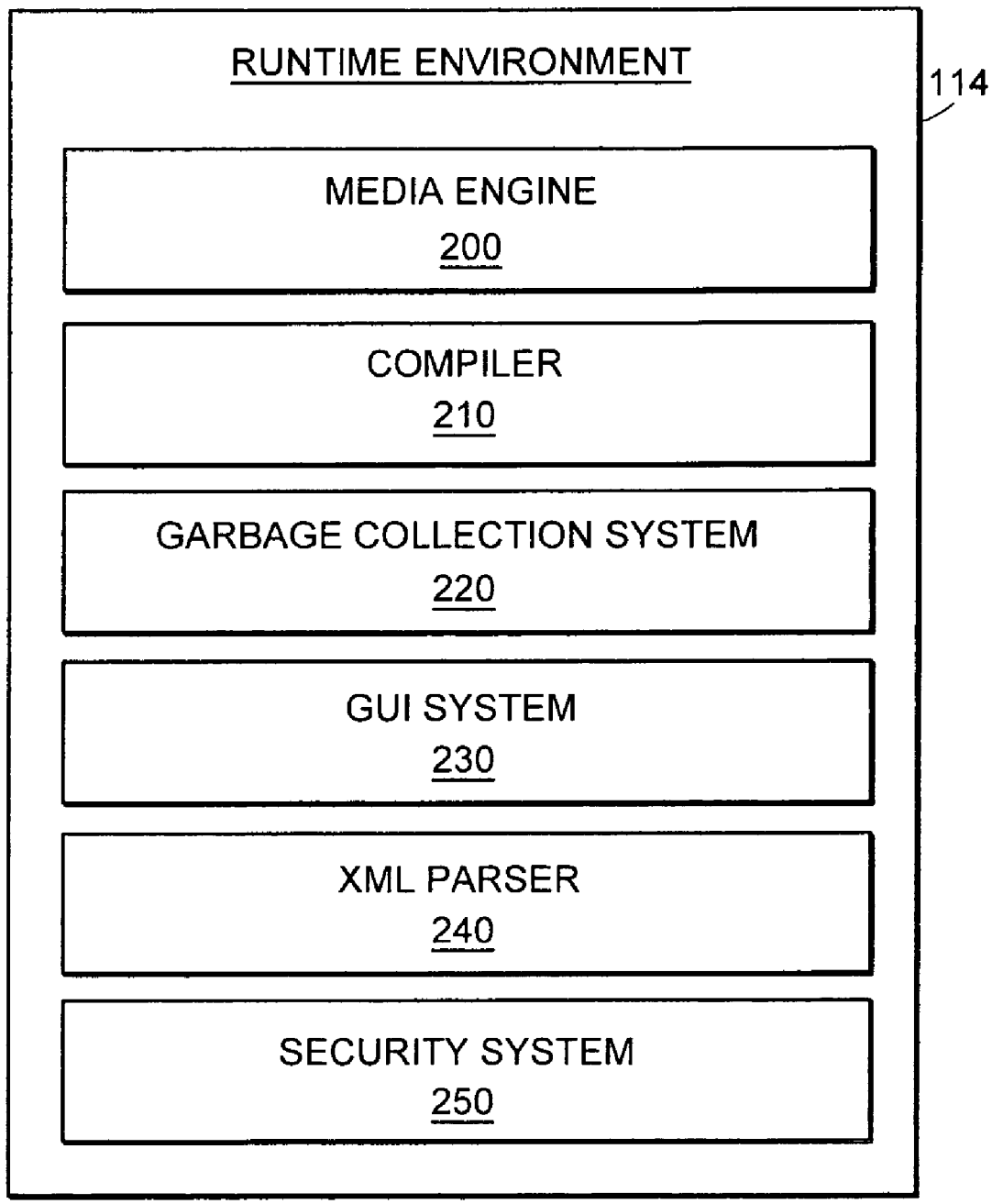
FIG. 2 is a diagram illustrating examples of software layers that may be included in a runtime environment according to an embodiment of the invention.

An example of some of the features that may be included in the client system 100 runtime environment 114 is shown in FIG. 2. The runtime environment 114 can include a multimedia engine 200, which preferably integrates seamlessly with other commercially available Internet technologies that provide multimedia capability (such as 3D graphical capability, animation, audio, etc.). A compiler 210 or execution engine, such as a just-in-time compiler, interprets the source code on the fly. This allows code to be generated dynamically on the server and delivered to the client 100 for execution without any need for pre-compilation. Usually, the compiler 210 can compile instructions into native CPU instructions. A memory allocation and/or defragmentation system 220, such as garbage collection, which ensures that memory resources are utilized optimally, can also be provided. The runtime environment can further include a graphical user interface system 230 that generates most of the graphics on the client 100, instead of being sent down as large files from the server. The runtime environment 114 can include an integrated XML parser 240 to allow direct interpretation of data streams encoded in XML. The XML parser 240 may provide support for related XML formats, such as Simple Object Access Protocol (SOAP), a lightweight XML-based messaging protocol used to encode information in Web request and response messages.

For advanced application-level client-side functionality that requires more access to client-side resources than normally required, the runtime environment 114 can employ a security system 250 based on a sandbox model, such as that described in U.S. patent application Ser. No. 09/672,712, which is incorporated herein by reference in its entirety. This model can limit a downloaded application's access to an end-user's system 100, while providing a mechanism for both unprivileged and privileged use of local client storage. Such applications can include downloaded applications (e.g. plug-ins or applets).

Referring to FIG. 1, downloaded applications are usually loaded by the browser 110 and delivered to the runtime environment 114 on the client system 100. Preferably, the server is free from much of the processing it typically does because the runtime environment 114 and downloaded application offload most of the processing tasks onto the client 100. The runtime environment 114 also facilitates offline operations so that the client 100 can be disconnected and still process and display downloaded content.

URL Based Licensing

Figure 3:
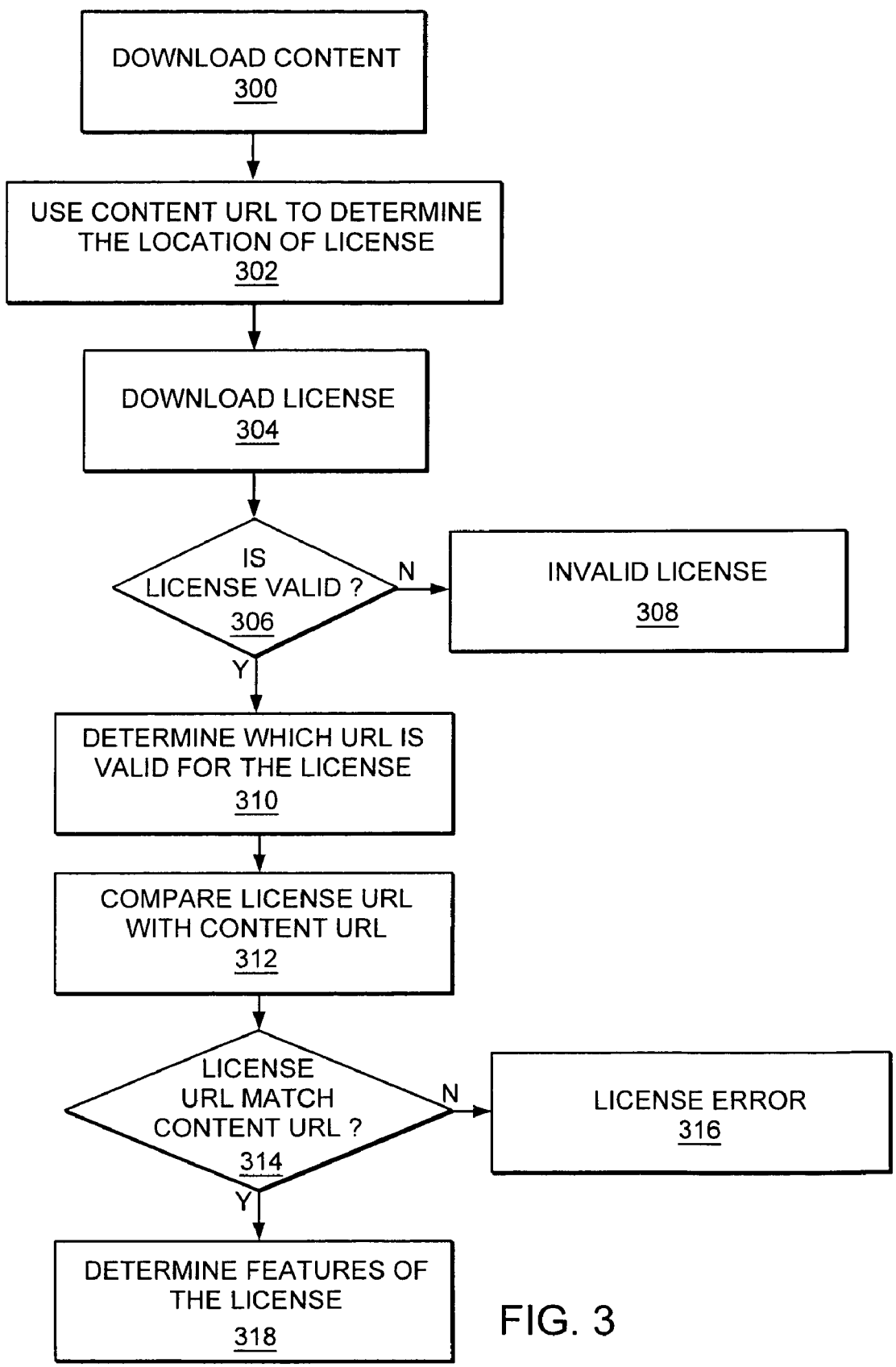
FIG. 3 is a flow diagram illustrating the process for licensing content from a server according to an embodiment of the invention.

FIG. 3 illustrates the process for licensing content from a server according to an embodiment of the invention. The client system downloads the digital content from a server at 300. The URL address of the content is used to determine the location of the license at 302. When the license is located, it is downloaded at 304. The system locates the signature of the license and verifies the signature to determine whether the license is valid at 306. By determining that the license is properly signed, the system can determine if there has been any tampering with, or modification of, the license. If the license is valid, then at 310 the license is used to determine which URL address is valid for the license. A URL pattern that indicates which URL addresses are valid for the license can be coded within the license file. The URL pattern in the license is compared with the URL of the content at 312. If, for example, the URL pattern matches the URL of the content at 314, then the license is valid. If the license is valid, then at 318 the features and terms of the license can be determined.

Software can be used to perform the licensing process described in FIG. 3. Software can be created or existing software can be modified to handle this licensing process. Referring to FIG. 1, such software can be a browser 110, plug-in or media player 112, runtime environment 114, dynamically linked library (DLL), ActiveX control, or any other form of executable code. The software designed to process the content includes routines and/or objects for recognizing and validating a license 130 from the server 102 and limiting execution of content 120 downloaded from the server 102 pursuant to the validity of the license 130. With the URL of the content 120, the software locates and verifies a license 130 for content that is downloaded from a server 102.

Locating the License

Given the URL of the content, the invention can find a license either through the root directory of the domain or the same directory as the content. Based on the prefix of the URL address of the content file, the invention can determine the URL location of the license. Typically, the structure of a URL address includes the communications protocol, hostname, and any sub-domains or subdirectories that appear to the left of the host name:

protocol://www.domain-name:port/sub_domain/filename

The portion of the URL before the first colon (:) shows which protocol should be used. Although the invention may be compatible with the various URL based protocols, e.g. FTP, telnet, gopher, news, etc., preferably, the URL address is in HTTP protocol. The hostname is the unique name by which a computer, and in this case the server, is known on a network. The sub-domain or subdirectory identifies the path to a file or resource residing on that server. If, for example, the URL of the requested digital content "start.curl" is:

http://www.domain.com/sub_domain/start.curl then, the license can be found through the root directory "http://www.domain.com/" or the subdirectory of the requested content "http://www.domain.com/sub_domain/". The invention looks first through the root directory and if the license is not found there then it looks through the subdirectory.

Figure 4:
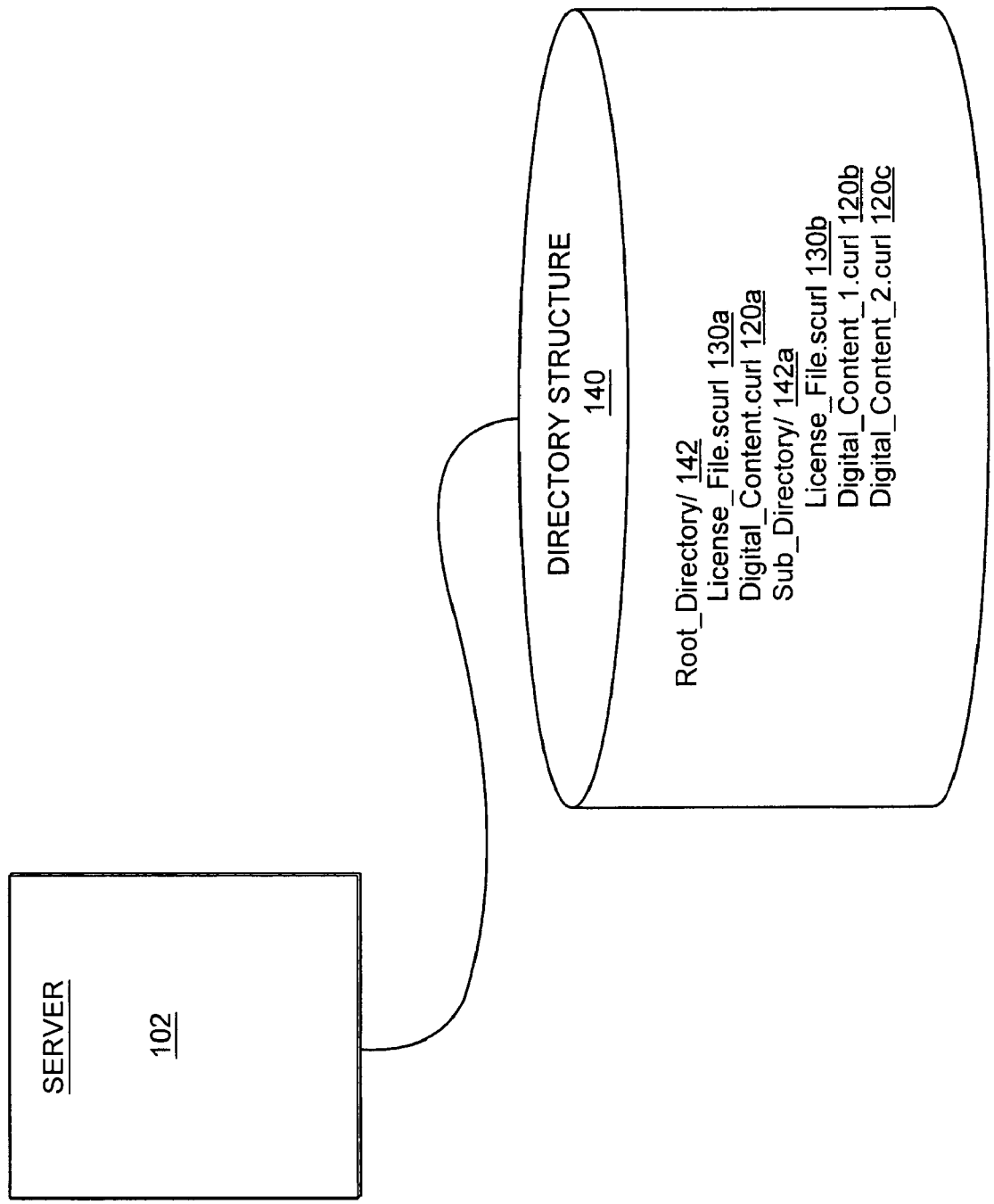
FIG. 4 is a diagram illustrating an example of a web server file directory structure.

FIG. 4 illustrates an example of a web server file directory structure. If a license 130a is stored through the Web root directory 142 of the server 102, the license can potentially cover any content 120a, 120b, 120c that is downloaded from that host name 142, so long as the license 130a is valid. Thus, a license 130a stored in the root directory 142 can override a license 130b located elsewhere on the server 102, such as a license in a subdirectory 142a. As a result, a single license can cover several different URL deployment locations. If the appropriate license is not found through the root web directory 142, then a subdirectory of the URL address of the desired digital content can be searched.

If a client, for example, is attempting to download digital content 120b, and an attempt to find a license through the root 142 was unsuccessful, then the subdirectory 142a of the content 120b can be examined to determine if the appropriate license exists. In this case, license 130b may be the appropriate license. In addition, the license file 130b stored in subdirectory 142a could potentially cover all content 120b, 120c in that subdirectory 142a. Therefore, the placement of a license on a server can be used as a mechanism to enable a single license to cover content from multiple URLs and directories.

A single license can cover multiple web server directories and also multiple hostnames. This can be achieved by indicating more than one hostname in the license. This can be particularly useful for servers that have several hostnames (e.g. aliases).

URL Pattern

The license 130 can be examined to determine which deployment locations are covered by the license. The deployment locations can be identified in the license 130 by determining a URL pattern referenced in the license 130. Preferably, the URL pattern determined from the license 130 is a shorthand reference to the licensed content, such as the hostname of the URL address of the licensed content or a URL prefix that corresponds to the URL of the content.

The URL prefix can be any valid hostname without a wildcard character. Preferably, two hostname components (DNS labels) follow an initial wildcard. For example any of the following URL patterns http://acme/products/
http://*.acme.com/products/ use valid URL prefixes for the purposes of licensing.

However, http://*.acme/
http://*/products/ are invalid URL prefixes for the purpose of licensing.

The URL pattern in the licensed file 130 can be a complete URL address, which is the same as the URL address of the licensed content. The URL pattern can be the same hostname and subdirectory as the URL address of the content, or it can be the IP address of the content. When the URL pattern includes an IP address, preferably it also includes the hostname of the server.

License Data

Figure 4A:
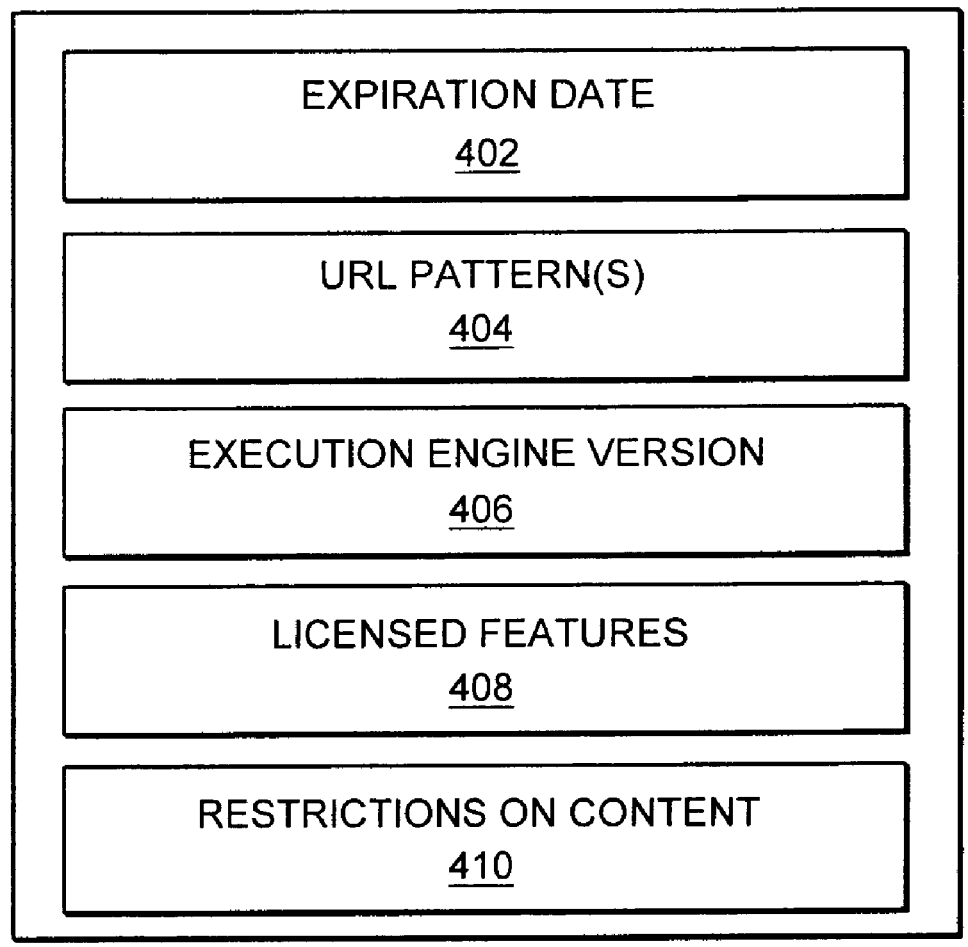
FIG. 4a is a diagram illustrating some of the data that may be included in a license file.

FIG. 4a shows examples of some of the data that may be included in a license 130. The license 130 includes an expiration date 402 for the license. The expiration date may indicate when the license becomes invalid. This enables the licensor to revoke the license after a certain period of time. If the license is an evaluation license, a grace period may be indicated. For example, a sixty-day time limit can begin the day the license is created.

The license 130 further includes information about a URL pattern 404, which identifies the corresponding URL address of the content that is covered by the terms of the license 130. The URL pattern 404, for example, can be a complete URL address, URL prefix, hostname or IP address associated with the content. One URL pattern 404 may cover more than one URL address. Further, multiple URL patterns 404 may be referenced in the license 130.

The license may include information about the version of the execution engine 406 that is used to process the content. The license can include information about licensed features 408 and/or restrictions 410. The features 408 and restrictions 410 can define an access policy, which identifies features of the content that are specifically enabled or disabled. Certain features, for example, may be enabled for a particular version of an execution engine 406, and disabled for another version. The restrictions 410, therefore, place limitations on the execution of the content.

The licensed features 408 and restrictions 410 can identify a licensing policy associated with the content. A plug-in creator, for instance, may choose a licensing policy that encourages the use of a plug-in for certain purposes, such as for non-commercial use or for product evaluation. The licensed features 408 can identify permissible functionality for executing the content and restrictions 410 can place limitations on the execution of the content 120. A basic set of functions, for example, that are associated with the content, may be made available under a non-commercial use license while at the same time, withholding access to advanced features.

The features 408 and restrictions 410 can depend on the type of content. For example, extra fees may be required when the content includes three-dimensional graphics. As a result, the processing of such content may need to be specifically authorized by the terms of the license 130. If the license 130 does not include information about a feature 408 enabling the rendering of three-dimensional graphics, the software running on the client system 100 may not be able to render the three-dimensional graphics of the licensed content 120.

The license 130 can be a digitally signed text file that is installed on a HTTP server. The digital signature enables the client side software, such as the runtime environment 114 or media player 112, to verify that the license 130 has been not been altered.

One method of signing involves applying a known cryptographic digesting algorithm to the content being signed in order to obtain a digest or hash of the content. The digest is then encrypted using a private key of a signing party to produce a digital signature. Another party may then authenticate the signature by computing the digest of the content using the same algorithm used by the signing party and comparing the results to the result of decrypting the signature with the public key of the signing party. *Applied Cryptography, Second Edition: Protocols, Algorithms, and Source Code in C*, by Bruce Schneier, published by John Wiley & Sons, Inc. in 1996, which is incorporated herein, provides additional information on the use and implementation of digital signatures. Further examples include the Java Cryptographic Extension (JCE) or Microsoft's Cryptographic API (CAPI).

The license key 130 can be an encrypted text file. Encryption techniques, such as asymmetric encryption (public-key encryption) or symmetric encryption, may be used.

According to an embodiment of the invention, the client runtime environment 114 cannot run licensed applications from a server 102 unless the license key 130 is on the server. The license key 130 permits the runtime environment 114 to run content 120 downloaded from the server 102. The server system 102 serves the licensed content 120 using the license key 130. When the runtime environment 114 gets the content 120, it automatically looks on the server 140 for the license key 130. This licensing method is generally directed to client-server communications using the HTTP, TCP/IP protocols because if the content was stored locally on the client 100, then the runtime environment 114 would be able to run the content. As long as the content is developed and run from local disk storage 100, no license key is needed. Thus, a license key 130 is not necessarily required to view and use applications or content on the client system 100. The end-user of the client system 100 does not need to obtain a license 130. Rather, the license 130 enables the server 102 to deploy digital content 120 to the client system 100. This licensing scheme enables the provider of software utilized in the interpretation of web content to license the use of that software for commercial purposes without controlling access to either the software or the content. Instead of controlling access to the software or the content, deployment of content from a server is controlled.

Licensing Parties

Figure 5:
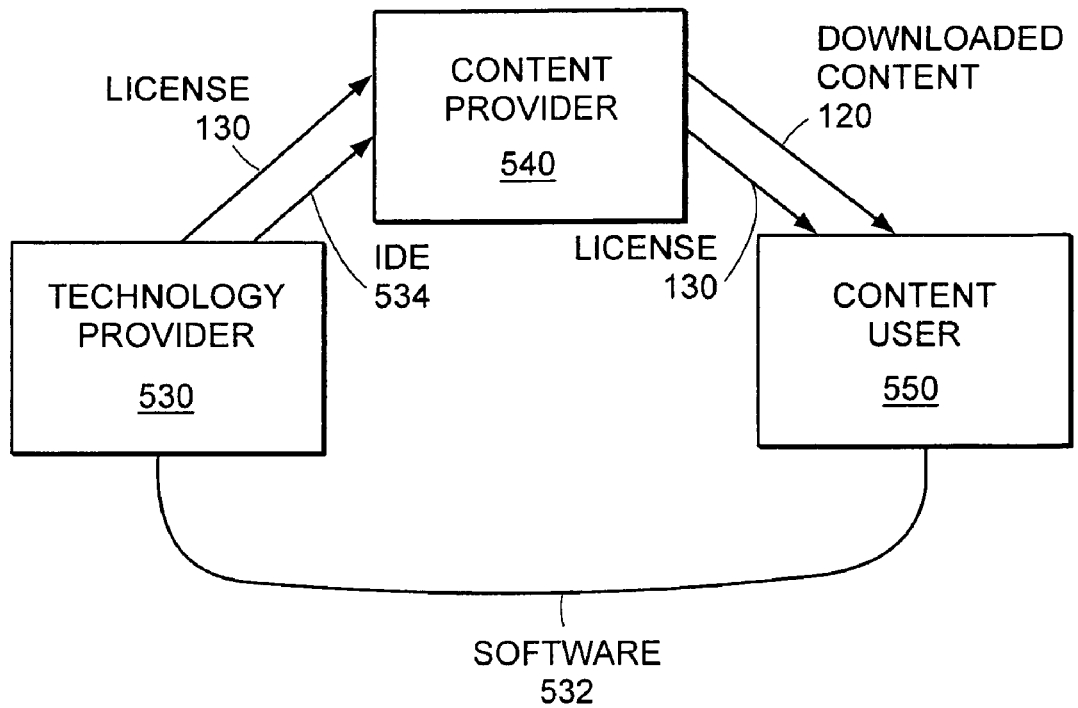
FIG. 5 is a flow diagram illustrating the content distribution between the licensing parties according to an embodiment of the invention.

FIG. 5 is a flow diagram illustrating the content distribution between the licensing parties according to an embodiment of the invention. A software developer or technology provider 530 provides a content provider 540 with a license key 130, which allows the content provider 540 to deploy digital content 120 from its server 102. The technology provider 530 produces software 532 capable of running and rendering the digital content 120 on a client system 100 if there is a license key 130 on the server 102 for the content 120. Thus, the license key 130 enables the software 532 to run the content 120 downloaded from the server 102. The license 130 can place restrictions on the processing of the content 120 on the client system 100.

The software 532 produced by the technology provider 530 can be any software capable of running the content 120. For example, the software can be a runtime environment 114, browser 110, or media player 112. In one preferred embodiment, the software 532 is the runtime environment 114. It can be desirable to distribute the software 532 based on a free-licensing scheme because it can increase the market share of the software 532.

The license 130 may be cached on the client system 100. This can be particularly useful when the license 130 refers to multiple URL addresses of content, such as several applications, that are covered by the license. A cached license can enable the client system 100 to continually access all content 120 covered by the license without having to expend system resources, such as bandwidth, because the client 100 does not need to go back to the server 102 each time it needs to determine that the content is licensed.

In one embodiment, the content provider 540 can request a license key 130 from the technology provider 530. In another embodiment, the content provider 540 can request a license key 130 from an automated license server (not shown). It should be understood by one skilled in the art that any one of content technology provider 530, content provider 540, and content user 550 may, at any time, perform the roles of any other. For example, Curl Corporation, of Cambridge, Mass., and Microsoft Corporation, of Redmond, Wash., are both content technology providers, content providers, and content users.

In an embodiment of the invention, the technology provider 530 also produces another software product 534, which enables the content provider 540 to create digital content 120 capable of being run by the software 532. For example, the software product can be an integrated development environment (IDE) used to create the digital media 120 (e.g. any interactive media, applications, objects, applets, data, etc). Curl Corporation's Surge™, Microsoft Corporation's Visual Studio.NET™ and Sun Microsystems's J2EE are examples of IDEs. Preferably, the license 130 is not required to view and run the content 120 with the IDE 534 or software 532. It can, however, be required to process content deployed from a server 102.

In general, the invention facilitates the widespread use and distribution of digital content 120 while providing technology providers 530 of the software 532 used to play that content 120 with a mechanism for garnering a financial return. This is accomplished by retaining control over the operations of the software 532 so as to control access to content 120 that requires the software 532.

Figure 6:
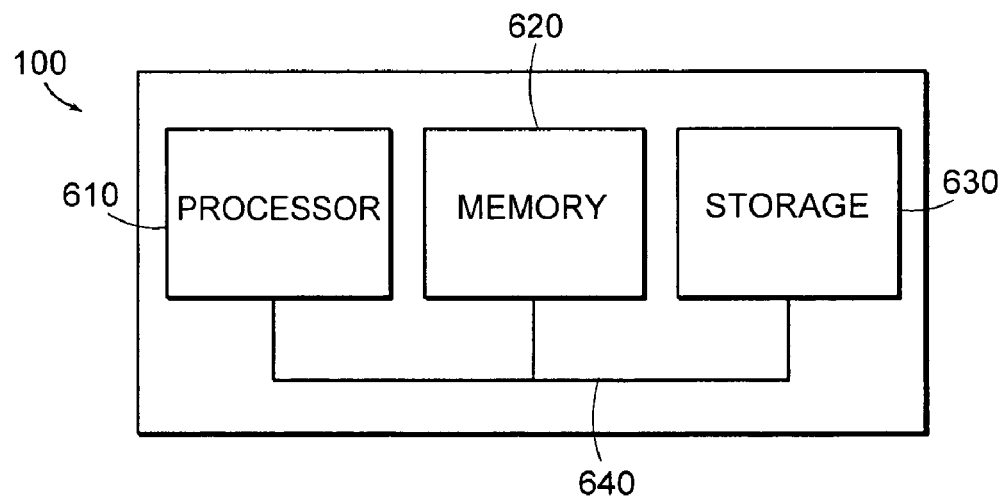
FIG. 6 is a schematic view of a computer system suitable for use with the present invention.

FIG. 6 is a schematic view of a computer system suitable for use with the present invention. The client computer system 100 may include, among other things, a processor 610, memory 620 and storage system 630. The processor 610 enables processing of licensing information. The memory 620 enables storing of information and instructions for processor 610. The storage system 630 can be, for example, a magnetic or optical disk system, which stores large amounts of information and instructions on a relatively long-term basis. The processor 610, memory 620, and storage system 630 are coupled to a bus 640, which provides a high-speed means for devices connected to the bus 640 to communicate with each other. The license 130 may be stored in the memory 620 or cache of the storage system 630 or the server, and this can enable the client to access content on the server 102 that is covered by the license 130.

It should be noted that the client side software 110, 112, 114, 116 shown in FIG. 1, is described as separate layers for purposes of illustration. Any of the software 110, 112, 114, 116 described could perform each other's functions, or there could be one layer of software that performs all of the functions. It should be further noted that although the software 110, 112, 114, 116 is shown above as being implemented on the client system 100, it could be implemented on any system, such as the server 102 or in a distributed computer system.

Figure 7:
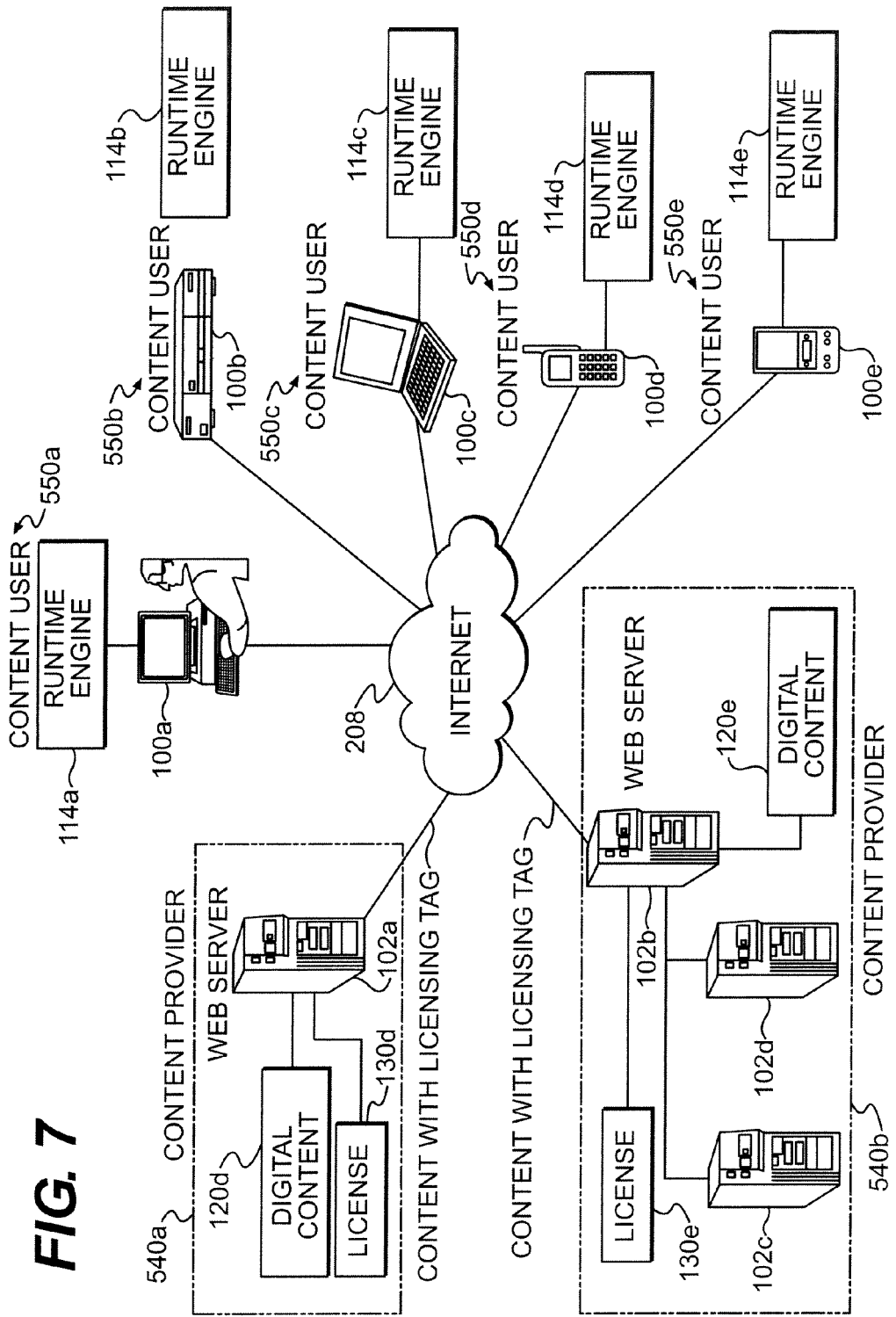
FIG. 7 is a schematic diagram illustrating the distribution of content between servers and clients in accordance with an embodiment of the invention.

It will be apparent to one of ordinary skill in the art that the client computer system 100 and server computer system 102 described are illustrative, and alternative systems and architectures may be used with the present invention. For example, FIG. 7 is a schematic diagram illustrating the distribution of content between servers and clients in accordance with an embodiment of the invention. Content providers 540a, 540b create, store, and deploy digital content 120d, 120e from their respective server 102a, 102b by storing licenses 130d, 130e. The digital content 120d, 120e is accessed through the Internet 208. Content providers 540a, 540b have web servers 102a, 102b respectively, that execute web server software (not shown) to process requests from users 550a-e of client systems 100a-e. Web servers 102a, 102b respond to these requests by sending the requested digital content 120d, 120e to the clients 100a-e. The client runtime engines 114a-e run the downloaded content if a valid license 130d, 130e is found on the server.

Figure 8:
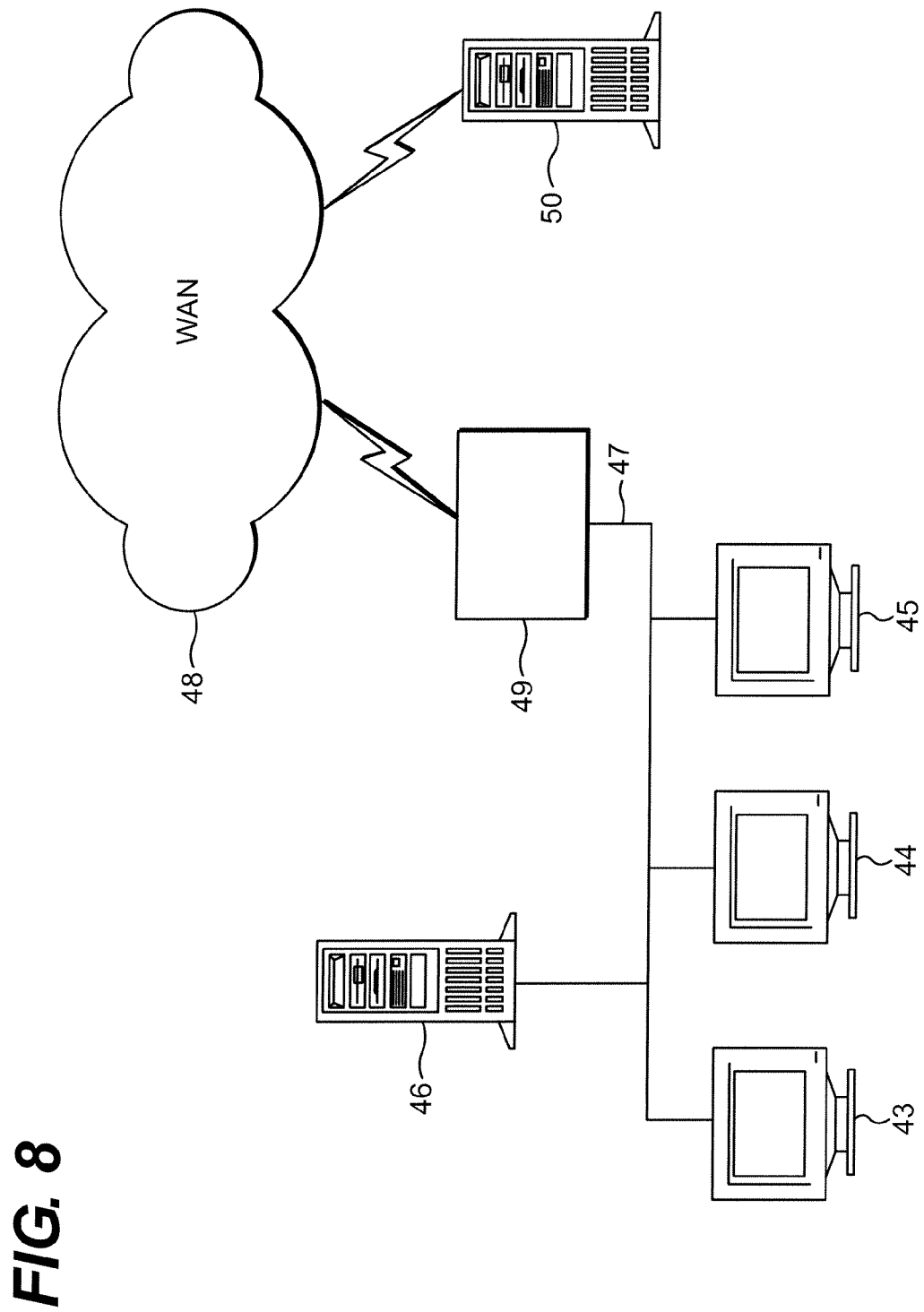
FIG. 8 is a diagram illustrating a computing environment on which the methods and apparatus of the present invention may be used.

Generally, the present invention may be used with any configuration of two or more computers, which may be interconnected on one or more networks. FIG. 8 is an illustrative computing environment on which the methods and apparatus of the present invention may be used. Computers 43, 44 and 45, and server 46 are connected to a local area network (LAN) 47. Each of computers 43, 44, 45 may execute software, all or part of which may be stored locally on computers 43, 44 and 45, or may be stored on server 46, and accessed over LAN 47.

LAN 47 is connected to a wide area network (WAN) 48, such as the Internet, through gateway 49, which may be a dedicated device, or may be a computer or server, similar to computers 43, 44 and 45, or server 46. By sending communications across WAN 48, any of the devices connected to LAN 47 may communicate with remote server 50, or with other devices or networks connected to WAN 48. Computers 43, 44 and 45 may gain access to information and software components on other computers through WAN 48.

It will be further apparent to those of ordinary skill in the art that methods involved in the present invention can be embodied in an apparatus or computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, optical, wired, or wireless, having program code segments carried thereon as digital or analog data signals.

While this invention has been particularly shown and described with references to preferred embodiments thereof, it will be understood by those skilled in the art that various changes in form and details may be made therein, without departing from the scope of the invention encompassed by the appended claims.

What is claimed is:

1. A computer-implemented method of determining whether digital content is licensed to be provided to a client system, the method comprising:
   providing a processor;
   receiving a content URL address for a content location on a server system at which a desired unit of digital content is stored;
   identifying a licensing information address from the content URL address,
      the licensing information address being different from the content URL address, and
      the licensing information address comprising an address to a licensing information location at which is stored licensing information from which licensed content URL addresses may be identified, the licensed content URL addresses comprising addresses of locations of licensed units of digital content that the server system is authorized to provide to a client system;
   using the licensing information address to access the licensing information at the licensing information location; and
   utilizing the processor for reviewing the content URL address and the licensing information to determine whether the content URL address comprises a licensed content URL address, wherein the reviewing further includes:
      determining a URL pattern referenced in the licensing information; and
      comparing the URL pattern referenced in the licensing information with the content URL address.

2. The computer-implemented method of claim 1, wherein comparing the URL pattern referenced in the licensing information with the content URL address further includes:
   confirming that the license covers the desired unit of digital content by determining that the URL pattern referenced in the licensing information corresponds to the content URL address.

3. The computer-implemented method of claim 2, wherein the URL pattern corresponds to the content URL address when the URL pattern matches the content URL address.

4. The computer-implemented method of claim 2, further comprising:
   responding to the URL pattern that corresponds to the content URL address by directing the client system to render the desired unit of digital content.

5. The computer-implemented method of claim 1, wherein identifying the licensing information address from the content URL address further includes:
   determining at least one potential location for the licensing information on the server system based on a prefix of the content URL address.

6. The computer-implemented method of claim 5, wherein the at least one potential location is determined through a directory system on the server system, the directory system having a root directory and at least one subdirectory.

7. The computer-implemented method of claim 6, further comprising:
   searching through the root directory for the licensing information.

8. The computer-implemented method of claim 6, further comprising:
   searching for the licensing information through the at least one subdirectory where the desired unit of digital content resides on the server system
   when:
      the licensing information is not found through the root directory, or
      the licensing information found through the root directory does not correspond to the desired unit of digital content.

9. The computer-implemented method of claim 1,
   wherein the end-user is a user of the client system;
   wherein the client system is the content provider for the end-user; and
   wherein identifying the licensing information address is in response to a request, by the client system, to download the desired unit of digital content from the content location to provide to the end-user.

10. The computer-implemented method of claim 9, further comprising:
    responding to the request by:
       delivering the desired unit of digital content to the client system,
       confirming that a URL pattern referenced in the licensing information corresponds to the content URL address; and
    in response to confirming that the URL pattern corresponds to the content URL address, rendering the desired unit of digital content on the client system.

11. The computer-implemented method of claim 1, wherein the licensing information includes a licensing key.

12. The computer-implemented method of claim 11, wherein the license key is an encrypted text file.

13. The computer-implemented method of claim 11, wherein the license key comprises a first license key, and further comprising:
    overriding any other license key on the server system when the first license key is located through a root directory of the content URL address.

14. The computer-implemented method of claim 1, wherein reviewing the content URL address and the licensing information further includes:
    determining whether the licensing information has been altered.

15. The computer-implemented method of claim 1, wherein the licensing information further includes information pertaining to restrictions on rendering of the desired unit of digital content.

16. The computer-implemented method of claim 1, wherein the licensing information further includes information about a feature of the desired unit of digital content that is enabled or disabled.

17. The computer-implemented method of claim 1, wherein the URL pattern referenced in the licensing information indicates one or more licensed content URL addresses.

18. A computer-readable hardware medium having computer executable instructions, which, when executed by a processor in a computer system, cause the processor to respond to a request to download a desired unit of digital content at a content location on a server system, the content location having a content URL address, by:
    identifying a licensing information address from the content URL address,
       the licensing information address being different from the content URL address, and
       the licensing information address comprising an address to a licensing information location at which is stored licensing information from which licensed content URL addresses may be identified, the licensed content URL addresses comprising addresses of locations of licensed units of digital content that the server system is authorized to provide to a client system;

using the licensing information address to access the licensing information at the licensing information location; and utilizing the processor for reviewing the content URL address and the licensing information to determine whether the content URL address comprises a licensed content URL address, wherein the reviewing further includes:

determining a URL pattern referenced in the licensing information; and comparing the URL pattern referenced in the licensing information with the content URL address.

19. The computer-readable hardware medium of claim 18, wherein the instructions to compare the URL pattern referenced in the licensing information with the content URL address further include:

instructions to confirm that the license covers the desired unit of digital content by determining that the URL pattern referenced in the licensing information corresponds to the content URL address.

20. The computer-readable hardware medium of claim 19, wherein the URL pattern corresponds to the content URL address when the URL pattern matches the content URL address.

21. The computer-readable hardware medium of claim 19, further comprising instructions for:

responding to a URL pattern that corresponds to the content URL address by directing the client system to render the desired unit of digital content.

22. The computer-readable hardware medium of claim 18, wherein the instructions for identifying the licensing information address from the content URL address further include:

instructions that determine at least one potential location for the licensing information on the server system based on a prefix of the content URL address.

23. The computer-readable hardware medium of claim 22, wherein the at least one potential location is determined through a directory system on the server system, the directory system having a root directory and at least one subdirectory.

24. The computer-readable hardware medium of claim 23, further comprising:

instructions for searching through the root directory for the licensing information.

25. The computer-readable hardware medium of claim 23, further comprising instructions for:

searching for the licensing information through the at least one subdirectory where the desired unit of digital content resides on the server system when the licensing information is not found through the root directory, or the licensing information found through the root directory does not correspond to the desired unit of digital content.

26. The computer-readable hardware medium of claim 18, wherein the end-user is a user of the client system;

wherein the client system is the content provider for the end-user;

wherein identifying the licensing information address is in response to a request, by the client system, to download the desired unit of digital content from the content location on the server system to provide to the end-user.

27. The computer-readable hardware medium of claim 26, further comprising:

instructions for responding to the request by:

delivering the desired unit of digital content to the client, confirming that a URL pattern referenced in the licensing information corresponds to the content URL address; and in response to confirming that the URL pattern corresponds to the content URL address, rendering the desired unit of digital content on the client system.

28. The computer-readable hardware medium of claim 18, wherein the licensing information further includes a license key.

29. The computer-readable hardware medium of claim 28 further including instructions for:

overriding any other license key on the server system when the license key is located through a root directory of the content URL address.

30. The computer-readable hardware medium of claim 18, wherein the instructions for processing the licensing information further include:

instructions that determine whether there are any restrictions on rendering of the desired unit of digital content.

31. A system for determining whether a desired unit of digital content is licensed, comprising:

a processor;

a communications handler responsive to a request to download a desired unit of digital content at a content location on a server system, the content location having a content URL address;

a licensing manager, in communication with the communications handler, the licensing manager having computer executable instructions operative on the processor for:

identifying a licensing information address from the content URL address, the licensing information address being different from the content URL address, and the licensing information address comprising an address to a licensing information location at which is stored licensing information from which licensed content URL addresses may be identified, the licensed content URL addresses comprising addresses of locations of licensed units of digital content that the server system is authorized to provide to a client system;

using the licensing information address to access the licensing information at the licensing information location; and utilizing the processor for reviewing the content URL address and the licensing information to determine whether the content URL address comprises a licensed content URL address, wherein the reviewing further includes:

determining a URL pattern referenced in the licensing information; and comparing the URL pattern referenced in the licensing information with the content URL address; and the licensing manager, utilizing the processor, providing authorization to the communication handler to download.

32. The software system of claim 31, wherein the communications handler or the licensing manager is associated with a runtime environment executing on a client system.

33. The software system of claim 31, wherein a client system initiates the request to download the desired unit of digital content from the content location on the server system.

34. The software system of claim 31, wherein the licensing manager is further configured to confirm that the license covers the desired unit of content when the URL pattern referenced in the licensing information corresponds to the content URL address.

35. The software system of claim 34, wherein the licensing manager is configured to respond to a URL pattern referenced in the licensing information that corresponds to the content URL address by directing the client system to render the desired unit of digital content.

36. The software system of claim 31, wherein the licensing manager is configured to obtain the licensing information by determining, based on a prefix of the content URL address, at least one potential location for the licensing information on the server system.

37. The software system of claim 36, wherein the licensing manager is configured to determine the at least one potential location through a directory system on the server system, the directory system having a root directory and at least one subdirectory.

38. The software system of claim 37, wherein the licensing manager further includes:
a search routine to search through the root directory for the licensing information.

39. The software system of claim 38, wherein the search routine is further configured to search for the licensing information through the at least one subdirectory which is the same directory where the desired unit of digital content is stored when:
the licensing manager determines that licensing information is not found through the root directory, or
the licensing information found through the root directory does not correspond to the desired unit of digital content.

40. The software system of claim 31, wherein the licensing manager further includes:
logic for forgoing processing of any other licensing information on the server system when the licensing information is located through the directory system, using a prefix of the content URL address.

41. The software system of claim 31, wherein the licensing manager is further configured to determine from the licensing information whether there are any restrictions on rendering of the desired unit of digital content.

42. A system for determining whether a unit of digital content is licensed, comprising:
a processor;
computer executable instructions operative on the processor comprising:
means for receiving a content URL address for a content location on a server system at which a desired unit of digital content is stored;
means for identifying a licensing information address from the content URL address,
the licensing information address being different from the content URL address, and
the licensing information address comprising an address to a licensing information location at which is stored licensing information from which licensed content URL addresses may be identified, the licensed content URL addresses comprising addresses of locations of licensed units of digital content that the server system is authorized to provide to a client system;
means for using the licensing information address to access the licensing information at the licensing information location; and
means for reviewing the content URL address and the licensing information to determine whether the content URL address comprises a licensed content URL address, wherein the means for reviewing further includes:
means for determining a URL pattern referenced in the licensing information; and
means for comparing the URL pattern referenced in the licensing information with the content URL address.

\* \* \* \* \*

UNITED STATES PATENT AND TRADEMARK OFFICE
CERTIFICATE OF CORRECTION

| | |
|---|---|
| PATENT NO. | : 7,516,147 B2 |
| APPLICATION NO. | : 10/692314 |
| DATED | : April 7, 2009 |
| INVENTOR(S) | : David A. Kranz, Robert H. Halstead, Jr. and Tom Lyons |

Page 1 of 1

It is certified that error appears in the above-identified patent and that said Letters Patent is hereby corrected as shown below:

Claim 32, column 14, line 60, "The software system" should read -- The system --.

Claim 33, column 14, line 63, "The software system" should read -- The system --.

Claim 34, column 14, line 66, "The software system" should read -- The system --.

Claim 35, column 15, line 4, "The software system" should read -- The system --.

Claim 36, column 15, line 9, "The software system" should read -- The system --.

Claim 37, column 15, line 14, "The software system" should read -- The system --.

Claim 38, column 15, line 19, "The software system" should read -- The system --.

Claim 39, column 15, line 23, "The software system" should read -- The system --.

Claim 40, column 15, line 32, "The software system" should read -- The system --.

Claim 41, column 16, line 1, "The software system" should read -- The system --.

Signed and Sealed this

Twenty-sixth Day of May, 2009

JOHN DOLL
*Acting Director of the United States Patent and Trademark Office*